United States Patent
Kiplinger et al.

(10) Patent No.: US 8,116,533 B2
(45) Date of Patent: Feb. 14, 2012

(54) OPERATOR INTERACTIVE DOCUMENT IMAGE PROCESSING SYSTEM

(75) Inventors: Michael John Kiplinger, Kalamazoo, MI (US); George T. Spray, Livonia, MI (US); Michael James Spall, Commerce, MI (US); Johan P. Bakker, Brighton, MI (US); David Brian Tratar, Dearborn, MI (US); Sammy C. Hutson, Novi, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1100 days.

(21) Appl. No.: 11/950,519

(22) Filed: Dec. 5, 2007

(65) Prior Publication Data

US 2009/0147317 A1 Jun. 11, 2009

(51) Int. Cl.
*G06K 9/00* (2006.01)

(52) U.S. Cl. .................. 382/112; 250/559.02; 348/92

(58) Field of Classification Search .................. 382/100, 382/112; 250/559.01, 559.04, 559.05, 559.06, 250/559.07; 348/92
See application file for complete search history.

(56) References Cited

U.S. PATENT DOCUMENTS

| | | | | | |
|---|---|---|---|---|---|
| 4,758,888 | A | * | 7/1988 | Lapidot | 348/91 |
| 5,754,673 | A | * | 5/1998 | Brooks et al. | 382/112 |
| 6,005,963 | A | * | 12/1999 | Bolle et al. | 382/124 |
| 6,108,672 | A | * | 8/2000 | DeJoseph | 715/203 |
| 2005/0071283 | A1 | * | 3/2005 | Randle et al. | 705/75 |
| 2006/0285746 | A1 | * | 12/2006 | Yacoub et al. | 382/176 |

* cited by examiner

*Primary Examiner* — Anand Bhatnagar
(74) *Attorney, Agent, or Firm* — Honigman Miller Schwartz and Cohn LLP (57) ABSTRACT

Methods and systems for operator intervention in a document processing system are disclosed. One possible method includes capturing images of documents within a document processing system. The method further includes executing computerized analysis of the images to establish an acceptability determination regarding the images. The method further includes manually reviewing the computer analysis of the images to confirm or override the acceptability determination.

13 Claims, 7 Drawing Sheets

OPERATOR INTERACTIVE DOCUMENT IMAGE PROCESSING SYSTEM

TECHNICAL FIELD

The present disclosure relates to a document image processing system and method. More particularly, the present disclosure relates to an interactive document image processing system and method, wherein the operator periodically reviews and overrides certain computer determined quality decisions.

BACKGROUND

When processing documents which are required to pass an image quality standard, processing delays in image quality parameters and high rates of false-positive image errors place extra burdens on mechanical design. Workers in the art will be familiar with methods of processing checks and other financial instruments. Though paper checks and similar financial instruments historically were used in transactions requiring a physical interchange of documents, the industry is trending toward the electronic interchange of document images. This shift from physical to electronic interchange presents new challenges in the design of check processing machines.

The Check Processing for the 21st Century Act of 2001 ("Check 21") put in place standards for the electronic interchange of check images and provided for electronic check images legal status in the check clearing system. In response to Check 21, check processors and manufacturers of check processing machines are transitioning to systems based on the electronic interchange of check images. In these systems, the paper check is often no longer present or recoverable after the initial transaction.

Because the original paper check often no longer exists, the quality of the captured check images is vital to the correct function of the clearing system. In the past, an illegible or otherwise insufficient quality paper check could be physically recovered and visually analyzed for verification. This can often no longer be done when paper checks have been physically destroyed, making it potentially impossible to accurately or swiftly reconcile a transaction.

To alleviate these problems, the industry and the Check 21 standards body have formulated common families of image quality references used in check image interchange. The manufactures of check processing machines have developed electronic and other tools to inspect and verify the captured images to warn machine operators of any defects. Upon being warned of a defect, the system operator can recover the physical check so that the image can be repaired or recaptured while the physical check is still available.

Conventionally, a check processing machine captures images of the front and back of a check and then applies various image-quality analyses and tests to the captured images. If the images pass the various tests, they are declared acceptable and the check from which they were captured is sorted with the other acceptable checks. If the images fail any of the various tests, the images are declared unacceptable and the check from which the images were captured is sorted with the other unacceptable checks. The operator will next analyze the reasons for the reported failures and then reprocess or otherwise correct the failures.

This conventional image error recovery process has several drawbacks when used in continuous process machines. First, there is a long delay, relative to the speed at which the machine is running, between capturing the image and a decision as to whether it is acceptable or unacceptable. Machines must be designed to compensate for the long delay before diverting a given check to acceptable or unacceptable receivers. Second, the rate of "false positives" is quite high. In fact, approximately 9 in 10 images deemed unacceptable by computer analysis are false positives. The high amount of false positives is attributable to the conservative approach that must be taken to ensure as few as possible legitimately unacceptable images are erroneously deemed acceptable.

Each of the false positives needs to be reprocessed, resulting in more delay in addition to the image quality decision delay. The false positive rate is even higher in the United States because of the wide range of check designs and formats, attributable to minimal check design standards combined with a large number of banks and check printers.

For these and other reasons, improvements are desirable.

SUMMARY

In accordance with the present disclosure, the above and other problems are solved by the following:

In a first aspect, a method of processing documents is disclosed. The method includes capturing images of documents within a document processing system. The method further includes executing computerized analysis of the images to establish an acceptability determination regarding the images. The method further includes manually reviewing the computer analysis of the images to confirm or override the acceptability determination.

In a second aspect, a document processing system is disclosed. The document processing system includes a control system. The system also includes a document imaging device, controlled by the control system, the document imaging device configured to create digital images of documents. The system also includes an image analyzing device, controlled by the control system, the image analyzing device configured to analyze the digital images created by the document imaging device. The system further includes a document receiving apparatus, controlled by the control system, the document receiving apparatus configured to receive the imaged documents in a plurality of pockets. The system also includes all operator override device configured to allow manual input into the control system to override the analysis of the image analyzing device.

In a third aspect, a document processing system is disclosed. The document processing system disclosed is used to create images of documents conforming to defined image quality standards. The system uses operator intervention and override to decrease processing time. The system includes means for controlling the various components of the system, means for imaging documents, means for automatically analyzing images to decide, based on defined image quality standards, whether an image is acceptable or unacceptable, means for temporarily storing imaged documents, and means for system operator override of automatic image quality analysis decisions.

DETAILED DESCRIPTION

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to improved methods and systems for document imaging and quality checking. A method involves optically imaging a stack of documents and outputting them into a document receiver (a "pocket") while awaiting computer image/data processing to complete. After each document is scanned, its scanned image is computer analyzed for image quality based on a given set of predetermined standards regarding image quality. If a scanned image is deemed unacceptable by the computer (a "computer unacceptable image"), the operator is shown the computer unacceptable image for visual review. If the operator deems the computer unacceptable image actually acceptable, the operator overrides the systems prior determination. If the operator overrides all computer unacceptable images to acceptable once image analysis is complete on the images of all documents in the pocket, then all documents in the pocket can be removed for further processing.

The disclosed methods and systems can significantly reduce the process time required in document imaging and quality checking systems. Using the methods and systems disclosed herein, an operator can reduce the impact of the high rate of false positives during the image quality check in document processing systems. Because of the relatively lengthy delay required for the image analysis, approximately 3 seconds, and to avoid lengthy amounts of track or stacking buffers, the document is immediately sent from the imaging stage to a pocket before the quality analysis is completed. There is no buffer used. This speeds up overall processing time. The operator override speeds up overall processing time even more. Without the operator override, the entire stack of documents in a pocket would have to be reprocessed in the event of a single computer unacceptable image, even if the failure was a false positive and the image was actually acceptable.

Figure 1:
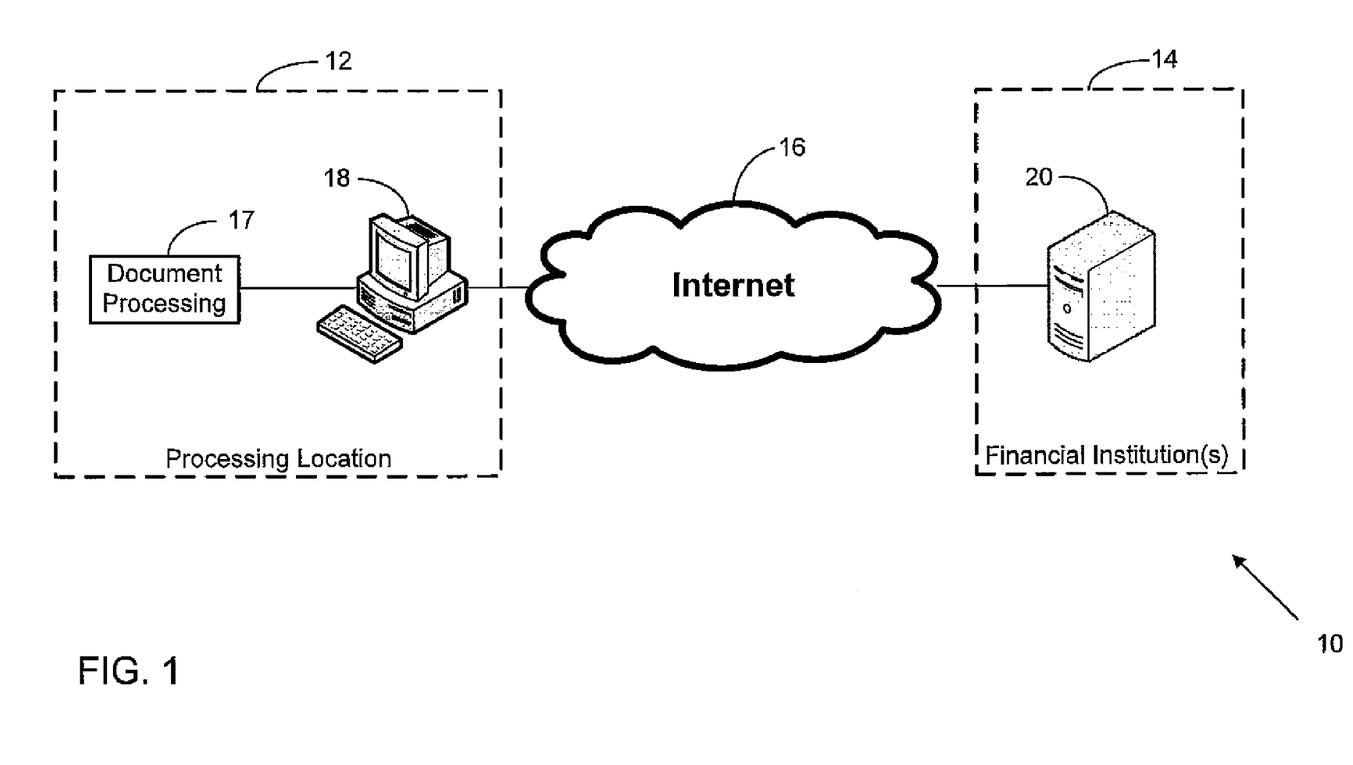
FIG. 1 is a schematic depiction of a network in which an electronic financial transaction may be placed, in accordance with the present disclosure.

One specific example of a document processing network in which the systems and methods of the present disclosure may be used is shown in FIG. 1. FIG. 1 illustrates a schematic view of a network 10 in which a financial transaction may take place, according to a possible embodiment of the present disclosure. The network 10 generally includes one or more document processing locations 12 and financial institutions 14, communicatively connected by a network, shown as the internet 16. A document processing location 12 may be any of a number of places of business at which a financial transaction may take processed, such as a location of a purchase or sale of goods and services, or a financial institution. In certain embodiments of the present disclosure, the document processing location 12 is a bank that processes a large number of checks for payment. Each document processing location 12 includes a document processing system 17 interconnected with a computing system 18. The document processing system 17 is arranged to provide the transaction location with the ability to electronically acquire information about a printed document, such as a check used for payment in exchange for goods and/or services. In certain embodiments, the document processing system 17 can include a check scanner and magnetic character reader, a printing device, and various sorting devices for capturing and/or printing information on one or both sides of a check. An example document processing system useable in the network 10 is described below in conjunction with FIG. 6.

The computing system 18 can be any of a number of types of computing systems, such as a general purpose personal computer, or a specialized computer such as a cash register or inventory system. The computing system 18 can interconnect with the document processing system 17 by any of a number of standard or specialized communication interfaces, such as a USB, 802.11a/b/g network, RF, infrared, serial, or other data connection. In certain embodiments, the computing system 18 runs an application configured to control the document processing system 17; in further embodiments, the computing system 18 receives data from the document scanner and stores and/or communicates the data (images, text, or other information) to other systems to which it is interconnected.

Each of the financial institutions 14 generally includes a computing system 20, which is configured to receive electronic records of financial transactions relevant to the financial institutions. The computing system 20 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions may be tracked using the network 10 as well.

The internet connection 16 depicted can be any of a number of WAN, LAN, or other packet based communication networks such that data can be shared among a number of computing systems or other networked devices. Furthermore, although in the embodiment shown two computing devices 18, 20 at different, specific locations are depicted, the computing devices and/or the document processing system 17 may be located at the same location or within the same network.

Figure 2:
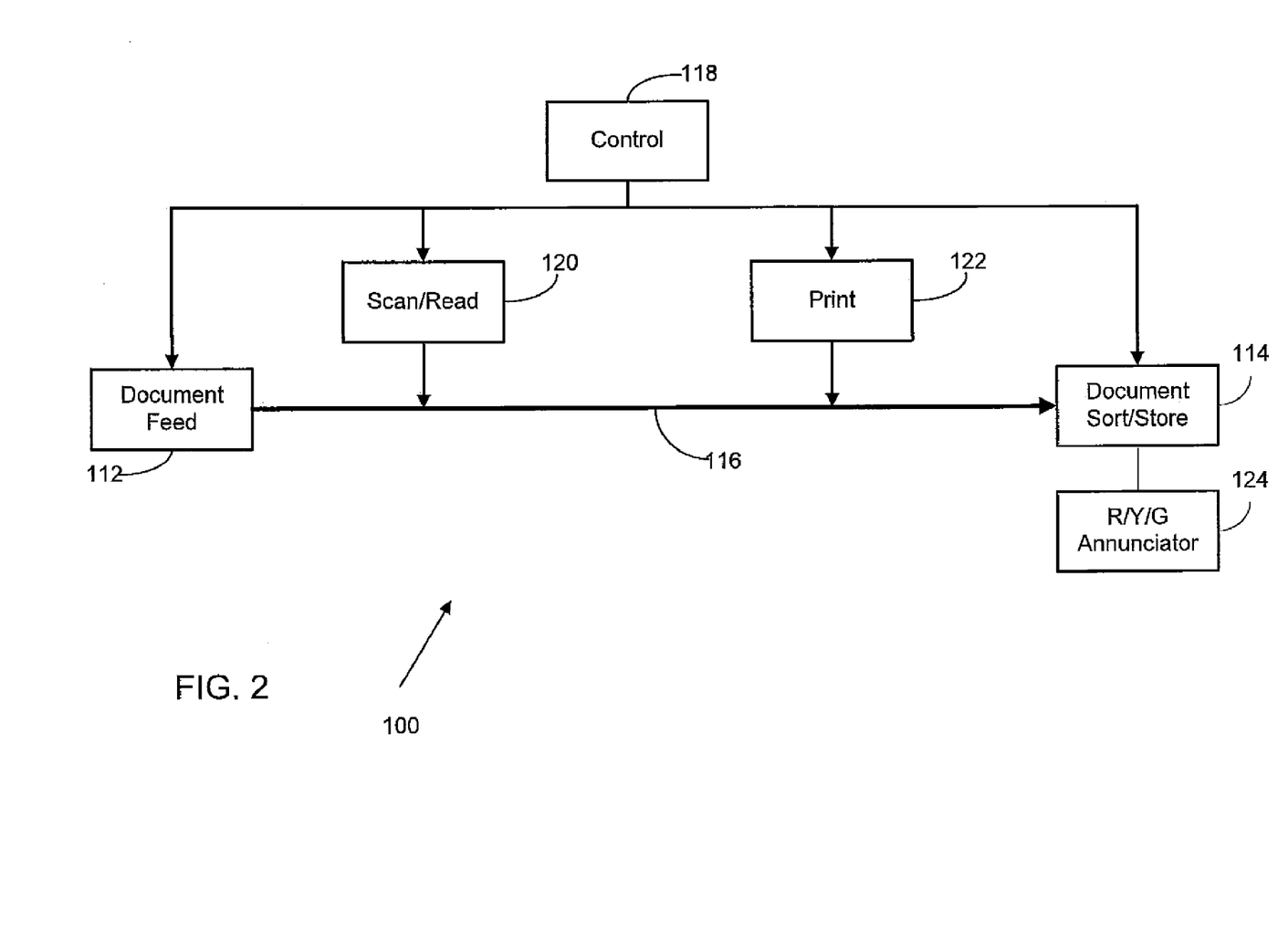
FIG. 2 is a schematic block diagram of an automated document processing system that can be used to implement aspects of the present disclosure.

Referring now to FIG. 2, an automated document processing system 100 is shown within which aspects of the present disclosure may be implemented. The automated document processing system 100 provides an overview of the basic steps required to process documents, such as checks, in a high-volume system in which user supervision is minimized. The automated document processing system 100 can represent, for example, a possible embodiment of the document processing system 17 of FIG. 1.

In one embodiment, the automated document processing system 100 is a check processing system used to print and scan checks at a financial institution or document processing company. The automated document processing system 100 includes a document feeder 112 interconnected with a document sorter along a path of travel 116 of documents. The document feeder 112 is generally a document take-up mechanism provided with a large number of documents that are required to be processed. In a possible embodiment, the document feeder 112 receives 600 or more documents, such as checks, for processing. The document sorter 114 is an endpoint at which the documents have been processed, and can include one or more sorting mechanisms and/or document receiving apparatus configured to arrange physical documents in a desired manner. The document sorter 114 places processed documents into one or more pockets, each of the pockets holding a number of processed documents. Additional details regarding methods of use of the document sorter are described in detail below.

The path of travel 116 may be defined by any of a number of document movement and/or guiding mechanisms, such as rollers, guides, or other systems able to grip and move documents from the document feeder 112 to the document sorter 114. A control system 118 is interconnected to the document feeder 112 and the document sorter 114 to control flow of documents along the path of travel 116. The control system 118 can be an application level program configured to control flow and processing of documents. The control system 118 can reside on a general purpose or specific purpose computing system capable of communicating with the document feeder 112 and document sorter 114.

The control system 118 further directs a scanning system 120 and a printing system 122. The scanning system 120 call scan one side of the documents passing along the path of travel 116, to store text and/or images displayed on the documents. The printing system 122 prints desired characters and/or images onto documents passing by the printing system along the path of travel 116. The printing system 122 can incorporate a print assembly which is configured to print from a stationary printing aperture onto moving documents passing by the printing system along the path of travel. In the example of a check processing system, the printing system 122 can print an endorsement onto the back of a check which is being processed at a financial institution operating the automated document processing system 100. Other documents may be processed as well, by financial institutions or other document processing entities.

Other functionalities may be incorporated along the path of travel 116, such as additional scanning, printing, or character reading systems. The existence of any of these additional systems is a matter of system configuration, depending upon the needs of the institution using the system.

An annunciator system 124 is associated with the document sorter 114, and provides an indication of the results of the sorting process and the types of documents placed into the various pockets of the automated document processing system 100. In a possible embodiment, the annunciator system is a three-indicator per pocket system having green, red, and yellow indicators providing an indication of whether all of the documents in a particular pocket have been successfully processed. In a further embodiment, the annunciator system is displayed within a user interface presented on a computing system, such as the system 18 of FIG. 1.

By passing documents through the automated document processing system 100, a large volume of documents can be printed and electronically captured, such that various records can be stored for each of a large number of documents. In the case of a financial institution processing checks or other documents, that institution can endorse a large number of checks, can capture check images and routing information, and can appropriately sort the document for distribution back to the issuing institution of the check.

In the automated document processing system 100, various delays may be added to allow an associated software application run in control logic or an associated computing system to allow software processing time, such as to validate the image and character data captured or to allow more detailed processing to reduce false positives or other errors. As the speed of the processing machinery increases, reducing the delay and false error rates becomes more important. A medium speed check processing machine, such as the Unisys Quantum or National Cash Register iTRAN series, processes checks at rates up to 600 per minute, in a continuous stream of single checks traveling at approximately 100 inches per second (2.54 meters per second.) These machines use buffers between the image-capture devices and the first decision point for sorting into acceptable or unacceptable receivers to allow for the 3 second delay in image analysis. Machines could include a track buffer or a standing buffer to accomplish delay. A length of buffer track along the path of travel 116 equivalent to 3 seconds is required, which is approximately 300 inches (7.5 meters) or 25 feet of track. This buffer cannot contain any other machine functions because any one of the checks in the buffer could potentially have an unacceptable image and should not be further processed. Machines could use "stacking" buffers instead of continuous-track buffers, where the checks that had been imaged but had not yet received an image quality determination are stacked together and then re-fed, as appropriate, into either acceptable or unacceptable receivers once the image quality decisions become available. The stacking buffer approach eliminates the need for extensive lengths of dedicated, non functional "buffer" track, but introduces added error rates because of the required stacking and re-feeding means. Error rates from feeding checks singly from a stack and then stacking checks individually are high, approximately double that of continuous track buffers, because of the variability of the check items.

A machine with a buffer in the path of travel 116 will experience little impact on throughput when it is run continuously, because documents pass through the machine at whatever rate at which the system is designed to perform. But, the buffer will have an impact on the true throughput when the machine operates in an intermittent mode. For example, a machine rated at a speed of 600 documents per minute which contains a 3 second buffer for image quality verification, will actually require 1 minute and 3 seconds to fully process 600 items, an actual throughput of about 570 documents per minute. Also, no buffer style approach will help reduce the time involved in reprocessing false positives. In reality, buffer style approaches will increase processing time because all of the computer determined unacceptable documents will require reprocessing, even though on average 9 out of 10 of these documents are actually acceptable.

Figure 3:
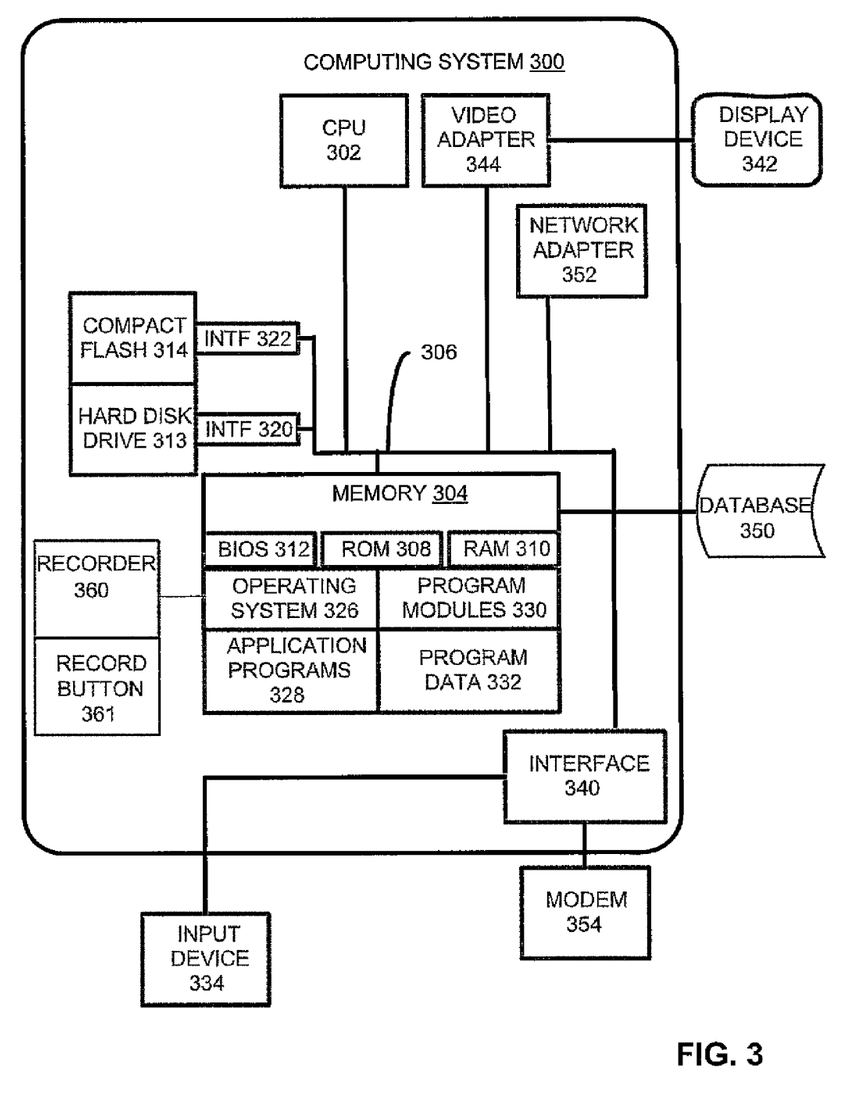
FIG. 3 shows a schematic representation of a computing system that can be used to implement aspects of the present disclosure.

Referring to FIG. 3, an exemplary environment for implementing embodiments of the present disclosure includes a general purpose computing device in the form of a computing system 300, including at least one processing system 302. In the various embodiments described herein, the general purpose computing device can correspond to the various computing devices of FIG. 1, such as the computing system 18 communicatively connected to the document processing system 17. The computing system 300 can provide functionality for performing aspects of the present disclosure reflected in the systems and methods disclosed in FIGS. 4-7. A variety of processing units 302 are available from a variety of manufacturers, for example, Intel or Advanced Micro Devices. The computing system 300 also includes a system memory 304, and a system bus 306 that couples various system components including the system memory 304 to the processing unit 302. The system bus 306 might be any of several types of bus structures including a memory bus, or memory controller; a peripheral bus; and a local bus using any of a variety of bus architectures.

Preferably, the system memory 304 includes read only memory (ROM) 308 and random access memory (RAM) 310. A basic input/output system 312 (BIOS), containing the basic routines that help transfer information between elements within the computing system 300, such as during start up, is typically stored in the ROM 308.

Preferably, the computing system 300 further includes a secondary storage device 313, such as a hard disk drive, for reading from and writing to a hard disk (not shown), and/or a compact flash card 314.

The hard disk drive 313 and compact flash card 314 are connected to the system bus 306 by a hard disk drive interface 320 and a compact flash card interface 322, respectively. The drives and cards and their associated computer readable media provide nonvolatile storage of computer readable instructions, data structures, program modules and other data for the computing system 300.

Although the exemplary environment described herein employs a hard disk drive 313 and a compact flash card 314, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk drive 313, compact flash card 314, ROM 308, or RAM 310, including an operating system 326, one or more application programs 328, other program modules 330, and program data 332. A user may enter commands and information into the computing system 300 through an input device 334. Examples of input devices might include a keyboard, mouse, microphone, joystick, game pad, satellite dish, scanner, digital camera, touch screen, and a telephone. These and other input devices are often connected to the processing unit 302 through an interface 340 that is coupled to the system bus 306. These input devices also might be connected by any number of interfaces, such as a parallel port, serial port, game port, or a universal serial bus (USB). A display device 342, such as a monitor or touch screen LCD panel, is also connected to the system bus 306 via an interface, such as a video adapter 344. The display device 342 might be internal or external. In addition to the display device 342, computing systems, in general, typically include other peripheral devices (not shown), such as speakers, printers, and palm devices.

When used in a LAN networking environment, the computing system 300 is connected to the local network through a network interface or adapter 352. When used in a WAN networking environment, such as the Internet, the computing system 300 typically includes a modem 354 or other means, such as a direct connection, for establishing communications over the wide area network. The modem 354, which can be internal or external, is connected to the system bus 306 via the interface 340. In a networked environment, program modules depicted relative to the computing system 300, or portions thereof, may be stored in a remote memory storage device. It will be appreciated that the network connections shown are exemplary and other means of establishing a communications link between the computing systems may be used.

The computing system 300 might also include a recorder 360 connected to the system memory 304. The recorder 360 includes a microphone for receiving sound input and is in communication with the system memory 304 for buffering and storing the sound input. Preferably, the recorder 360 also includes a record button 361 for activating the microphone and communicating the sound input to the system memory 304.

A computing device, such as computing system 300, typically includes at least some form of computer-readable media. Computer readable media can be any available media that can be accessed by the computing system 300. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 300.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 4:
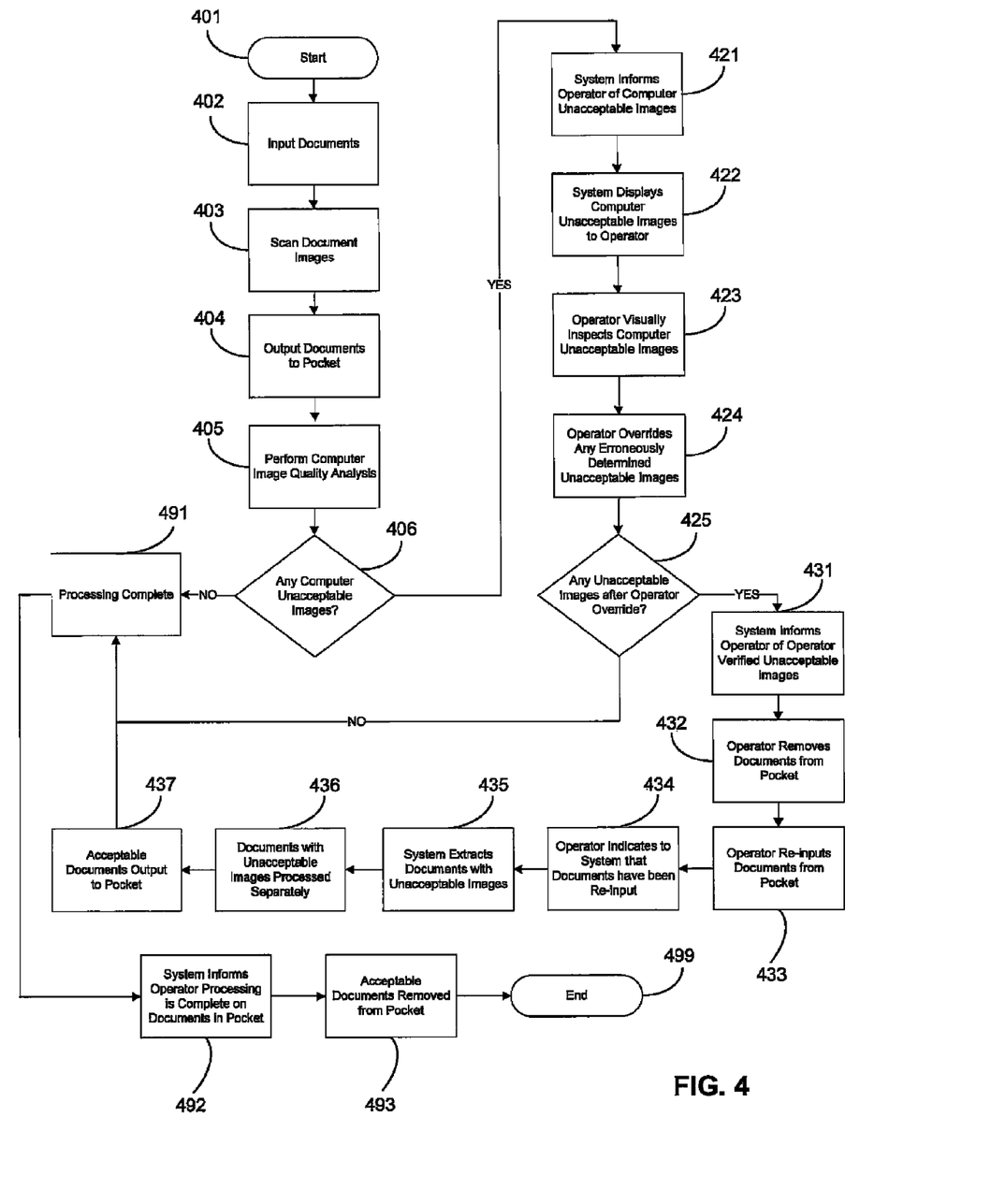
FIG. 4 is a flow diagram demonstrating an illustrative process for an operator interactive document image system, in accordance with the present disclosure.

A flow diagram for one specific example of a method of a document processing system incorporating an operator interactive document image system is shown in FIG. 4. A Start Operation 401 corresponds to a start of document processing in a document processing system. At Input Module 402, a stack of documents is input into the system by an operator according to the present disclosure. The system optically scans each document at Scanning Module 403, resulting in a digital image. Immediately after the document is scanned at Scanning Module 403, it is output to a pocket at Output Module 404 and a computer image quality analysis is performed at Analysis Module 405.

The computer image quality analysis determines, based on a predetermined set of criteria, whether a particular image meets a desired threshold of image quality. The system keeps track of which documents' images do and do not pass the quality analysis. Images which pass the quality analysis are deemed acceptable and those which do not pass the quality analysis are deemed unacceptable. Because unacceptable images might actually be acceptable upon further inspection, images deemed by the system as unacceptable will be referred to as "computer unacceptable images." All documents, both those with acceptable and computer unacceptable images, are sent to the same pocket before the system has determined whether the images are acceptable or unacceptable. The system keeps track of where each physical document with a corresponding computer unacceptable image is located in the pocket. One possible way the system could keep track of which documents have corresponding computer unacceptable images, is by maintaining and coordinating a database of all the analyzed images, the quality status of each image, and the position of the physical documents in the pocket.

Once the image quality analysis has completed on a filled pocket and every image associated with each document has been declared either acceptable or unacceptable by the system, Image Operator 406 determines whether there are any documents with computer unacceptable images present in the pocket. If there are no documents with computer unacceptable images present in the pocket, Image Operator 406 branches "NO" to Processing Complete Module 491. At Processing Complete Module 491, the images of all the documents in the pocket are acceptable and the image processing is complete. The system informs the operator at Info Module 492 that the processing is complete and the documents are removed from the pocket by the operator at Removal Module 493. The method of FIG. 4 completes at End 499, but can be repeated for a new stack of documents.

Referring back to Image Operator 406, if there are any documents with computer unacceptable images present in the pocket the logic branches "YES" and the system informs the operator that there are computer unacceptable images at Info Module 421. Next, the system displays the computer unacceptable images to the operator at Display Module 422. The operator visually inspects the computer unacceptable images at Inspection Module 423 and overrides any erroneously determined computer unacceptable images to acceptable images at Override Module 424. Statistically, about 9 out of 10 of the computer unacceptable images will be false positives that the operator can override before all the documents require additional processing. The system alters its database to reflect any operator override, updating any initially determined computer unacceptable images to correctly be categorized as acceptable.

If, at Image Operator 425, no unacceptable images remain after operator override, the logic branches "NO" to Processing Complete Module 491. At processing complete module 491, the images of all the documents in the pocket are acceptable and the image processing is complete. The system informs the operator at Info Module 492 that the processing is complete and the documents are removed from the pocket by the operator at Removal Module 493. The method of FIG. 4 is now complete at End 499, but can be repeated for a new stack of documents.

Referring back to the Image Operator 425, if any unacceptable images remain after operator override, the system informs the operator at Info Module 431 that documents with operator verified unacceptable images are in the pocket which must be extracted. Next, the operator removes all the documents from the pocket at Removal Module 432 and re-inputs all the documents into the system at Re-input Module 433. At Indication Module 434, the operator indicates to the system that a stack of documents, that contains documents requiring extraction, has been re-inserted into the system. The operator also indicates from which pocket the stack of documents came from. The system utilizes the database it has created and updated for the documents found in the particular pocket in question, to correctly extract the offending documents. The system then extracts the documents with operator verified unacceptable images from those with acceptable images at Extraction Module 435. The system also updates its database indicating the removal of the extracted unacceptable documents.

The documents with operator verified unacceptable images are processed separately at Processing Module 436. The separate document processing at Processing Module 436 may be operator manual processing or processing by some other method. The acceptable documents are output to the pocket in Output Module 437. At Processing Complete Module 491, the images of all the documents in the pocket are acceptable and the image processing is complete. The system informs the operator at Info Module 492 that the processing is complete and the documents are removed from the pocket by the operator at Removal Module 493. The method of FIG. 4 is now complete at End 499, but can be repeated for a new stack of documents.

Figure 5:
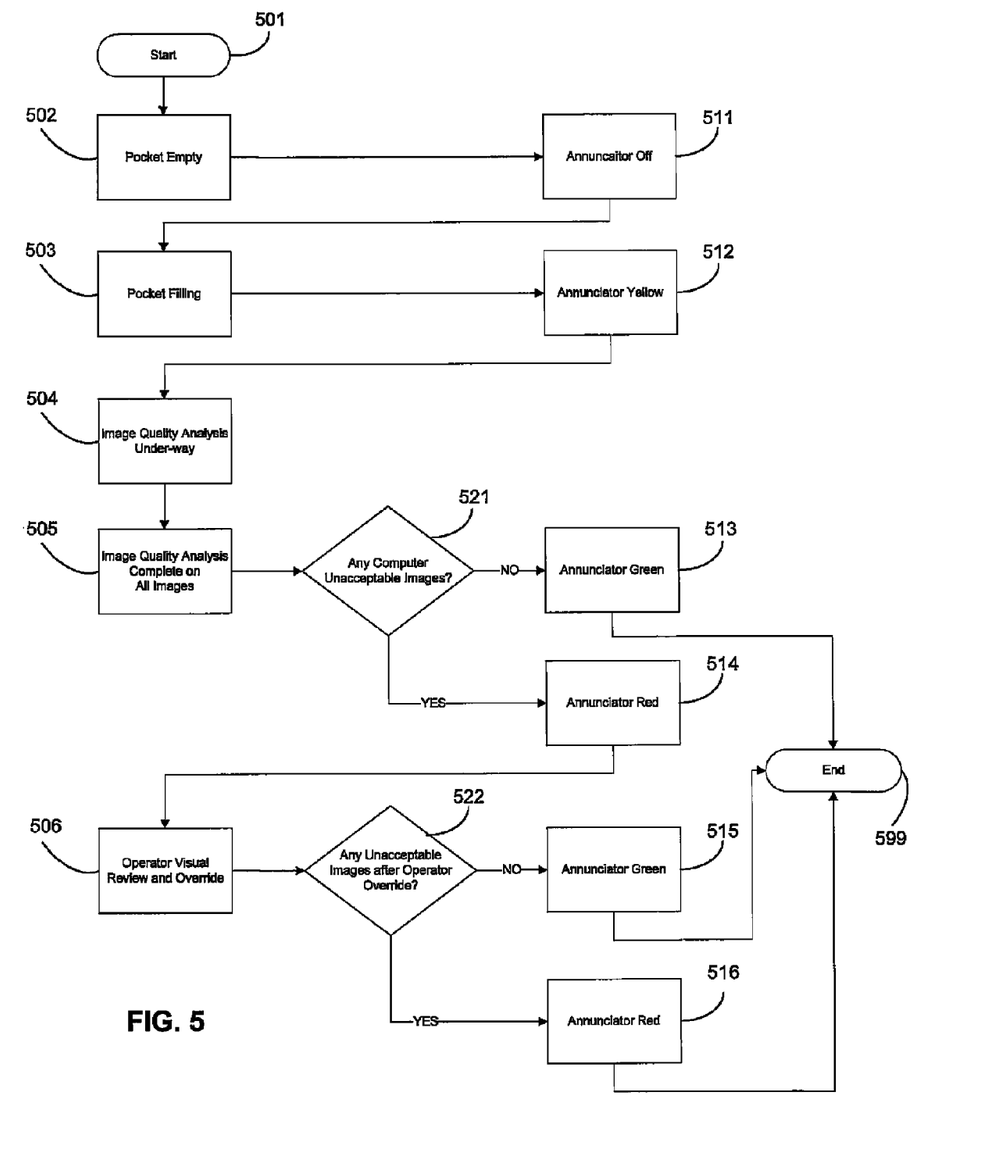
FIG. 5 shows a flow diagram demonstrating usage of annunciators to signal system status to an operator according to the present disclosure.

FIG. 5 shows a specific method of using annunciators to signal the status of the documents in a particular pocket in accordance with this disclosure. The method can be used, for example, in conjunction with the document processing methods and systems described in FIG. 4, within a document processing system. Specifically, FIG. 5 shows usage of a set of multi-signal annunciators associated with each pocket. The annunciators could be a series of three colored lights (red, yellow, and green) to indicate the image quality status of the entire pocket contents. Those having skill in the art recognize that other types of annunciator systems call be used. The purpose of the annunciators is to quickly and easily advise the operator of the image quality status of the documents in the pocket to which they refer.

Operation of the method begins at a Start Operation 501. The Start Operation 501 initiates processing of documents through a document processing system having one or more output pockets. When a pocket is completely empty at Empty Module 502, its annunciator is turned off at Annunciator Off Module 511. When documents first start filling the pocket at Filling Module 503, the yellow annunciator illuminates at Yellow Annunciator Module 512, indicating the pocket contains checks whose image quality status is not yet known. The pocket will continue to fill with the documents until it Teaches its capacity limit or the control system ceases to direct items to that pocket. While the pocket is filling with imaged documents, image quality analysis of the document images is being undertaken at Analysis Module 504. Once documents cease to enter the pocket, the annunciator will stay yellow until the image quality analysis is complete, at Analysis Complete module 505, for every document which has entered the pocket. At Image Operator 521, the system determines whether any documents with corresponding computer unacceptable images are present in the pocket. On average, it has been observed that approximately one in every two filled pockets will only contain documents with acceptable image quality. If, at Image Operator 521, there are no unacceptable images, the green annunciator will illuminate at Annunciator Green Module 513, indicating that all items in the pocket are acceptable and that they can be removed for continued processing.

Referring back to Image Operator 521, if there are any documents with unacceptable images present in the pocket, the red annunciator will illuminate at Annunciator Red Module 514. The red annunciator will illuminate on average, once in every two filled pockets, or about once every 600 items (approximately once per minute). If the annunciator turns red by branching to Annunciator Red Module 514, the operator is shown the image and requested to visually review and override the computer unacceptable image determination if necessary at Review/Override Module 506. At Review/Override Module 506, the operator reviews all the unacceptable images and decides whether the images are truly unacceptable or not. If the unacceptable images are actually acceptable, the operator overrides the computer unacceptable image determination by input through a keypad or button. Those having skill in the art may recognize other appropriate input devices.

At Image Operator 522, the system determines whether any unacceptable images remain after the operator override. If, after the operator reviews and overrides any erroneously determined computer unacceptable images, all the images are now confirmed acceptable, the green annunciator illuminates at Annunciator Green Module 515 and the items in the pocket can be removed for continued processing. If some unacceptable images remain (approximately every 10th time there is an unacceptable image initially reported), the annunciator for the pocket containing the item will remain red and stay red at Annunciator Red Module 516. The operator will be directed by the control system how to resolve the defect and/or how the remaining acceptable items are to be disposed of in accordance with this disclosure. The suspect item can be recovered either by rerunning the documents in the pocket through the system to extract the verified unacceptable documents, as described above in the description of FIG. 4, or by manually recovering the documents.

Though FIGS. 4 and 5 have focused on implementations where the operator is not asked to review and potentially override any computer unacceptable images until the image quality analysis is completed on all the documents in a particular pocket, it is also possible that the operator review and override occur immediately upon the computer deeming any unacceptable image present, even if it there are still more documents being added to the pocket. If immediate review and override are implemented, the annunciators could change accordingly to indicate the precise status of the system. For example, immediately upon an individual document being deemed unacceptable by the system, the red annunciator would illuminate, the operator would be shown the image and would visually review and potential override the system determination. If the operator reviews an individual document image and overrides the system decision after finding it to be erroneously deemed unacceptable, the red annunciator for the pocket in question reverts to yellow as long as another unacceptable image has not been detected in the interim. If another unacceptable image is detected while the operator is visually reviewing and overriding the computer unacceptable image, the annunciator will remain red and the operator will follow the review and selection procedure outlined above. If, after the annunciator reverts to yellow, another unacceptable image is detected, it will change to red and the operator will follow the review and selection procedure outlined above.

As previously described, although the specific annunciators of the present disclosure are described as configured in a tri-color configuration associated with each pocket, other embodiments may include differently configured annunciators, such as annunciators presented on a user interface generated in computer software, or on a display associated specifically with each pocket.

Figure 6:
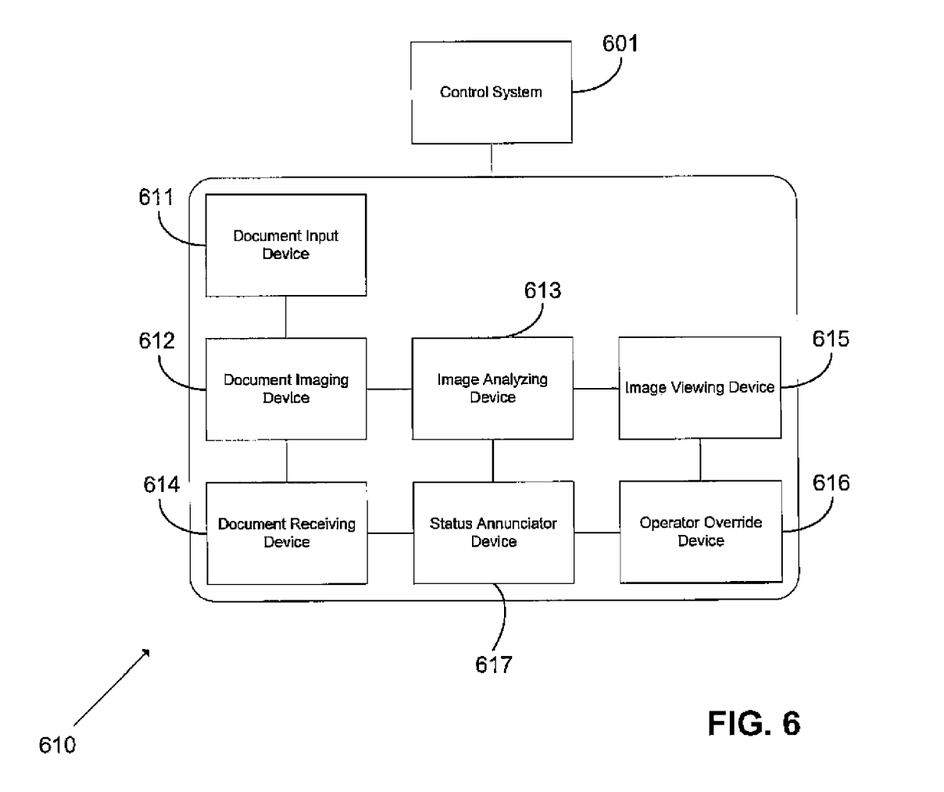
FIG. 6 shows a schematic representation of a document processing system implementing aspects of the present disclosure.

FIG. 6 shows a schematic diagram of document image processing system 600 with operator override in accordance with the present disclosure. Control System 601 coordinates all the other devices found in System 600. System 600 includes at least one Document Input Device 611, controlled by Control System 601. Stacks of documents are placed in Document Input Device 611 for processing. It is possible that System 600 have multiple document input devices.

System 600 further includes at least one Document Imaging Device 612, controlled by the Control System 601. Document Imaging Device 612 is used to create digital images of the documents as they pass through the system. Document Imaging Device 612 receives documents from Document Input Device 611 and scans each document, creating a digital image. It is possible that System 600 have multiple document imaging devices used in conjunction with one or multiple document input devices.

System 600 further includes at least one Image Analyzing Device 613, controlled by the Control System 601. Image Analyzing Device 613 receives the digital images created by Document Imaging Device 612 and analyzes each image based on a given set of predetermined criteria. Document Imaging Device 612 determines whether each image meets a particular quality threshold, malting it acceptable, or if it fails to meet the quality threshold, making it unacceptable. Control System 601 keeps track of which images are acceptable and which are unacceptable, as well as which document relates to each image. It is possible that System 600 have multiple image analyzing devices. It is also possible that another device, instead of Control System 601, keep track of which images are acceptable and which are unacceptable, as well as which document relates to each image.

System 600 further includes at least one Document Receiving Device 614, controlled by the Control System 601. All the documents are sent to Document Receiving Device 614 after they are imaged by Document Imaging Device 612, and before each document's image quality analysis is completed by Image Analyzing Device 613. A document receiving device, such as Document Receiving Device 614 is sometimes called a pocket by those having skill in the art. It is possible that System 600 have multiple document receiving devices connected to one or more document imaging devices, in order to expedite the document processing of System 600.

System 600 further includes at least one Image Viewing Device 615 and at least one Operator Override Device 616, both controlled by the Control System 601. Image Viewing Device 615 is used to display computer unacceptable images in accordance with the disclosure of the method of FIG. 4. The Image Viewing Device 615 is used in conjunction with the Operator Override Device 616. The Operator Override Device 616 is also controlled by the Control System 601. The Operator Override Device 616 is used by the operator to override the status of any erroneously determined computer unacceptable images to acceptable images in accordance with the disclosure of the method of FIG. 4. Operator Override Device 616 is also used to verify the unacceptability of correctly determined computer unacceptable images. Operator Override Device 616 could potentially be a keyboard, keypad, a single button, series of buttons, a touchpad, mouse, trackball, voice recognition interface, or any other appropriate input device. It is possible that System 600 have multiple image viewing devices and operator override devices to facilitate enhanced and/or quicker document processing with System 600.

Finally, System 600 includes at least one Status Annunciator Device 617, which is also controlled by the Control System 601. Status Annunciator Device 617 is used to signal to the operator of System 600 the status of the system. Specifically, a Status Annunciator Device 617 can be put on every Document Receiving Device 614 to indicate the status of the documents in the Document Receiving Device 614 in accordance with the method of FIG. 5. For example, the Status Annunciator Device 617 could illuminate a particular color to indicate whether or not the Document Receiving Device 614 contains any documents with associated images of unacceptable quality. The Status Annunciator Device 617 could also indicate that the Document Receiving Device 614 associated with it is empty, partially full, or completely full. It is possible that Status Annunciator Device 617 indicate any other appropriate information to the operator. It is possible that System 600 have multiple status annunciator devices to facilitate enhanced and/or quicker document processing with System 600.

Figure 7:
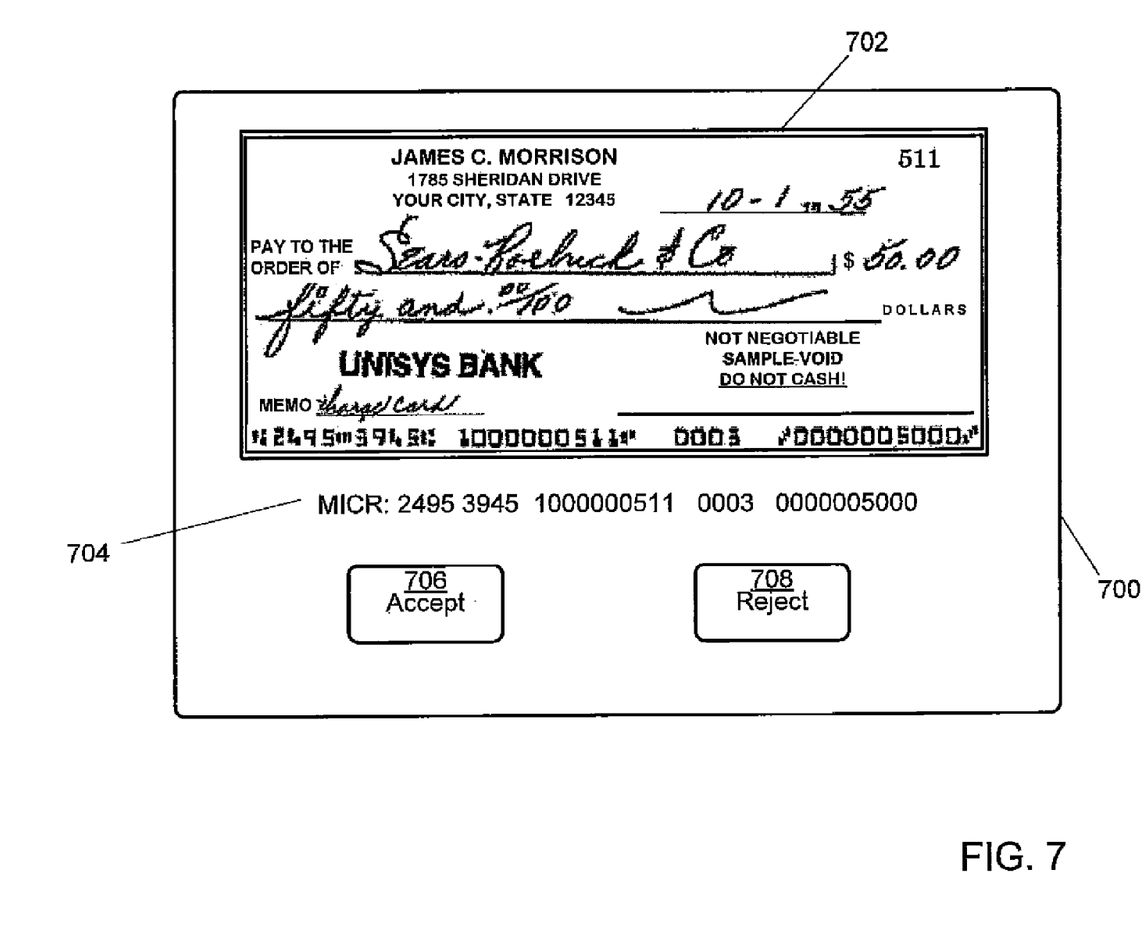
FIG. 7 shows one possible embodiment of a visual display and selection system used by a system operator to review and override the system's image quality decisions.

FIG. 7 illustrates a sample user interface 700 useable in conjunction with the methods and systems disclosed herein, regarding interactive document image processing. The user interface 700 includes an image display region 702, a data display region 704, an accept button 706 and a reject button 708. The display region 702 displays one or more captured images of the document processed in the document processing system. In the embodiment shown, the image is an image of a front side of a check being processed using the systems and methods described herein; other documents or images of documents may also be displayed. The data display region 704 displays non-image data detected from the document processed, such as alphanumeric data captured from the document by optical recognition, magnetic character reading, or other means.

An operator of a document processing system can review the image and data display regions 702, 704 to determine whether the captured information is acceptable or not. The operator uses the accept button 706 and the reject button 708 to indicate whether or not the captured information is in fact acceptable. In the embodiment described herein, the user interface 700 displays only captured information from documents which an automated, computerized system determines to be inaccurately captured. Therefore, the operator presses the accept button 706, through a mouse click, keyboard input, or other means, to override the automated determination and indicate that the rejected document is in fact a "false positive." Conversely, operator selection of the reject button 708 indicates that the operator confirms that the document is inaccurately captured.

The accept button 706 and reject button 708 can be renamed in other embodiments of the user interface screen. For example, the accept button 706 could alternatively be labeled an "override rejection" button, while the reject button 708 could be renamed a "confirm rejection" button. Other possibilities for renaming or reformatting the buttons 706, 708, or user interface 700 as a whole, are possible as well.

It is understood that the user interface 700 provides a simple example of a user interface with which an operator can visually inspect captured image and/or character data. Other functionality can be included into the user interface to be displayed to the operator, such as controls allowing the operator to more closely inspect the images, navigation controls allowing the operator to inspect more than one document in varying orders, an image region for a rear portion of the document, and other information.

Referring now to the overall disclosure, an illustrative example of operation of the methods and systems described herein is provided. In this example of execution of the methods and systems described herein, each pocket contains around 300 documents. The number 300 is chosen because it is the amount of documents that an average system operator can take out of a pocket with one hand. On average, an unacceptable image will only occur once every 600 documents, approximately every other filled pocket. 9 out of 10 times, this unacceptable image will actually be acceptable and will be converted by the operator to an acceptable image without any document extraction or reprocessing. This substantially increases the overall speed of the document processing using the system.

On average, in a system that does not implement the methods and systems described herein, the total processing time for 6000 documents is about 15 minutes. This is a throughput of about 400 documents per minute. It only takes about 10 minutes to run the 6000 items through the machine initially. But, out of those 6000 items there will be about 10 initially unacceptable images, which may or may not actually be unacceptable. Each of the 10 items would need to be extracted, viewed, verified, and replaced correctly in the sequence. This would take about 30 seconds per item for a total of five minutes. About 10 minutes for the initial run added to about 5 minutes for the additional extraction, verification, replacement process equals about 15 minutes total processing time.

On average, in a system incorporating the disclosed methods and systems, the total processing time for 6000 documents is only about 11 minutes. This is a throughput of about 545 documents per minute. Again, it only takes about 10 minutes to run the 6000 documents through the machine initially. Because of the operator override of 9 out of 10 computer unacceptable images, only 1 document needs resolution. The time to resolve the 1 document that actually has unacceptable image quality is 1 minute total, 30 seconds to rerun the entire pocket of 300 items containing the unacceptable check and another 30 seconds to view, verify, and resolve the item. About 10 minutes for the initial run added to about 1 minute to resolve the 1 document with a verified unacceptable image equals about 11 minutes total processing time.

Using the disclosed methods and systems, a system can increase throughput by about 36%, raising it from about 400 to about 545 documents per minute. In addition, a system using the disclosed improvement can reduce errors attributable to manual reprocessing and simplify machine construction.

Although the present disclosure is discussed in conjunction with a compact document processing system, and in particular a system for processing checks, it is understood that the same operational principles apply in larger systems, or systems that process other types of documents. Furthermore, although certain aspects, such as the operator interface and annunciator system are disclosed as providing a certain visual configuration, it is further understood that alternative visual configurations may provide analogous functionality and are encompassed by the present disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A document processing system comprising:
   a control system;
   a document imaging device, controlled by the control system, the document imaging device configured to create digital images of documents;
   an image analyzing device, controlled by the control system, the image analyzing device configured to analyze the digital images created by the document imaging device;
   a document receiving apparatus, controlled by the control system, the document receiving apparatus configured to receive the imaged documents in a plurality of pockets; and an operator override device configured to allow manual input into the control system to override the analysis of the image analyzing device.

2. The document processing system of claim 1, further comprising an image display device controlled by the control system and configured to display images of documents.

3. The document processing system of claim 1, further comprising at least one status annunciator device, controlled by the control system, wherein the status annunciator device indicates system status.

4. The document processing system of claim 1, wherein the status annunciator device is used to indicate whether or not a particular document receiving apparatus contains any documents with associated images of an unacceptable quality.

5. The document processing system of claim 1, wherein the image analyzing device determines, based on defined image quality standards, whether a particular image is acceptable or unacceptable.

6. The document processing system of claim 1, wherein the operator override device comprises a keyboard.

7. The document processing system of claim 1, wherein the operator override device comprises at least one button.

8. The document processing system of claim 1, wherein the operator override device allows operator selection of a document's image quality.

9. The document processing system of claim 1, wherein the operator override device operates using a computer system communicatively connected to the control system.

10. The document processing system of claim 1, wherein the control system includes a computer system.

11. A document processing system for creating images of documents conforming to defined image quality standards and using system operator intervention and override to decrease processing time, wherein the system comprises:
means for controlling the various components of the system;
means for imaging documents;
means for automatically analyzing images to decide, based on defined image quality standards, whether an image is acceptable or unacceptable;
means for temporarily storing imaged documents;
means for allowing a system operator to override automatic image quality analysis decisions.

12. The document processing system of claim 11, further comprising means for displaying images to the system operator.

13. The document processing system of claim 11, further comprising means for indicating system status to the system operator.

* * * * *